(12) United States Patent
Gartland

(10) Patent No.: US 11,140,835 B2
(45) Date of Patent: Oct. 12, 2021

(54) WALL MOUNTED AGRICULTURAL ASSEMBLY

(71) Applicant: Hortech, Inc., Nunica, MI (US)

(72) Inventor: Leo Vincent Gartland, Norton Shores, MI (US)

(73) Assignee: Hortech, Inc., Nunica, MI (US)

( * ) Notice: Subject to any disclaimer, the term of this patent is extended or adjusted under 35 U.S.C. 154(b) by 154 days.

(21) Appl. No.: 16/456,991

(22) Filed: Jun. 28, 2019

(65) Prior Publication Data

US 2020/0404860 A1   Dec. 31, 2020

(51) Int. Cl.
*A01G 9/02* (2018.01)
*A01G 27/00* (2006.01)

(52) U.S. Cl.
CPC ........... *A01G 9/025* (2013.01); *A01G 27/003* (2013.01); *A01G 27/005* (2013.01); *A01G 27/008* (2013.01)

(58) Field of Classification Search
CPC ........ A01G 9/022; A01G 9/023; A01G 9/025; A01G 27/003; A01G 27/005; A01G 27/008; A01G 31/06
USPC .................... 47/79, 82, 83, 48.5, 62 E, 62 C
See application file for complete search history.

(56) References Cited

U.S. PATENT DOCUMENTS

| | | | | |
|---|---|---|---|---|
| 3,053,011 A * | 9/1962 | Silverman | ............... | A01G 31/06 47/79 |
| 4,294,037 A * | 10/1981 | Mosse | .................... | A01G 18/10 47/59 R |
| 4,295,296 A * | 10/1981 | Kinghorn | ............... | A01G 9/025 47/82 |
| 4,630,394 A * | 12/1986 | Sherard | ................... | A01G 31/02 47/59 R |
| 5,428,922 A * | 7/1995 | Johnson | ................. | A01G 9/023 47/62 R |
| 7,594,355 B1 * | 9/2009 | Aagaard | ................ | A01G 9/247 47/1.01 R |
| 9,655,308 B2 * | 5/2017 | MacKenzie | ............ | A01G 9/025 |
| 10,517,229 B2 * | 12/2019 | MacKenzie | ............ | A01G 9/025 |
| 2011/0252704 A1 * | 10/2011 | Cho | ........................ | A01G 9/025 47/66.6 |
| 2013/0074408 A1 * | 3/2013 | Singh | ...................... | A01G 31/02 47/62 E |
| 2014/0075840 A1 * | 3/2014 | Gosling | ................. | A01G 27/04 47/81 |
| 2014/0223815 A1 * | 8/2014 | Kuo | ........................ | A01G 9/025 47/82 |
| 2016/0066524 A1 * | 3/2016 | Williams | ................ | A01G 31/06 47/62 R |

FOREIGN PATENT DOCUMENTS

EP    3329766 A1 *  6/2018   ............. A01G 31/06

* cited by examiner

*Primary Examiner* — Lisa L Tsang
(74) *Attorney, Agent, or Firm* — Price Heneveld LLP

(57) ABSTRACT

A wall mounted agricultural assembly includes a first planter and a second planter below the first planter, and a water supply arrangement that includes a fluid supply delivering fluid from a fluid supply to the first and second planters and a first valve configured to allow or prevent fluid flow to the planters, and a second valve configured to prevent or allow fluid to bypass the planters.

19 Claims, 4 Drawing Sheets

WALL MOUNTED AGRICULTURAL ASSEMBLY

BACKGROUND

The embodiments disclosed herein relate to a planting system, and in particular to a modular wall planting system that is adapted to secure to a vertical surface of a wall or a building structure that reduces uneven watering between vertically offset planting levels.

SUMMARY OF THE INVENTION

One embodiment disclosed herein provides a wall mounted agricultural assembly that includes a first planter configured to attached to a substantially vertical wall structure at a first vertical height and having a first interior space configured to receive plant matter, a second planter configured to attach to the wall structure at a second vertical height that is less than the first vertical height and having a second interior space configured to receive plant matter, and a water supply arrangement. The water supply arrangement includes a fluid supply line configured to deliver a fluid from a fluid supply to the first interior space of the first planter and the second interior space of the second planter, a first valve in fluid communication with the fluid supply line downstream of the fluid supply and upstream of the first planter, the first valve operable between an open position where a fluid may be provided from the fluid supply to the interior space of the first planter and the interior space of the second planter, and a closed position preventing the fluid from being supplied from the fluid supply to the interior space of the first planter and the interior space of the second planter, and a second valve in fluid communication with the fluid supply line downstream of the second planter, the second valve operable between a closed position requiring the fluid to enter the interior space of the first planter and the interior space of the second planter, and an open position allowing the fluid to bypass the interior space of the first planter and the interior space of the second planter, wherein the second valve is in the closed position when the first valve is in the open position, and the second valve is in the open position when the first valve is in the closed position.

Another embodiment provides a wall mounted agricultural assembly that includes a first planter configured to attached to a substantially vertical wall structure at a first vertical height and having a first interior space configured to receive plant matter, a second planter configured to attach to the wall structure at a second vertical height that is less than the first vertical height and having a second interior space configured to receive plant matter, and a water supply arrangement. The water supply arrangement includes a fluid supply line configured to deliver a fluid from a fluid supply to the first interior space of the first planter and the second interior space of the second planter, a first valve in fluid communication with the fluid supply line downstream of the fluid supply and upstream of the first planter, the first valve operable between an open position where a fluid may be provided from the fluid supply to the interior space of the first planter and the interior space of the second planter, and a closed position preventing the fluid from being supplied from the fluid supply to the interior space of the first planter and the interior space of the second planter, and a second valve in fluid communication with the fluid supply line downstream of the second planter, the second valve operable between a closed position requiring the fluid to enter the interior space of the first planter and the interior space of the second planter, and an open position allowing the fluid to bypass the interior space of the first planter and the interior space of the second planter, wherein the second valve is in the closed position when the first valve is in the open position, and the second valve is in the open position when the first valve is in the closed position. The water supply arrangement further includes a drain tube in fluid communication with the second valve and positioned downstream of the second valve, wherein the fluid drains into the drain tube when the when the second valve is in the open position, and wherein the drain tube is located vertically below the second valve, and a controller configured to control the first and second valves between the open and closed positions, respectively.

These and other advantages of the invention will further be understood and appreciated by those skilled in the art by reference to the following written specification, claims and appended drawings.

DETAILED DESCRIPTION OF THE PREFERRED EMBODIMENTS

Figure 1:
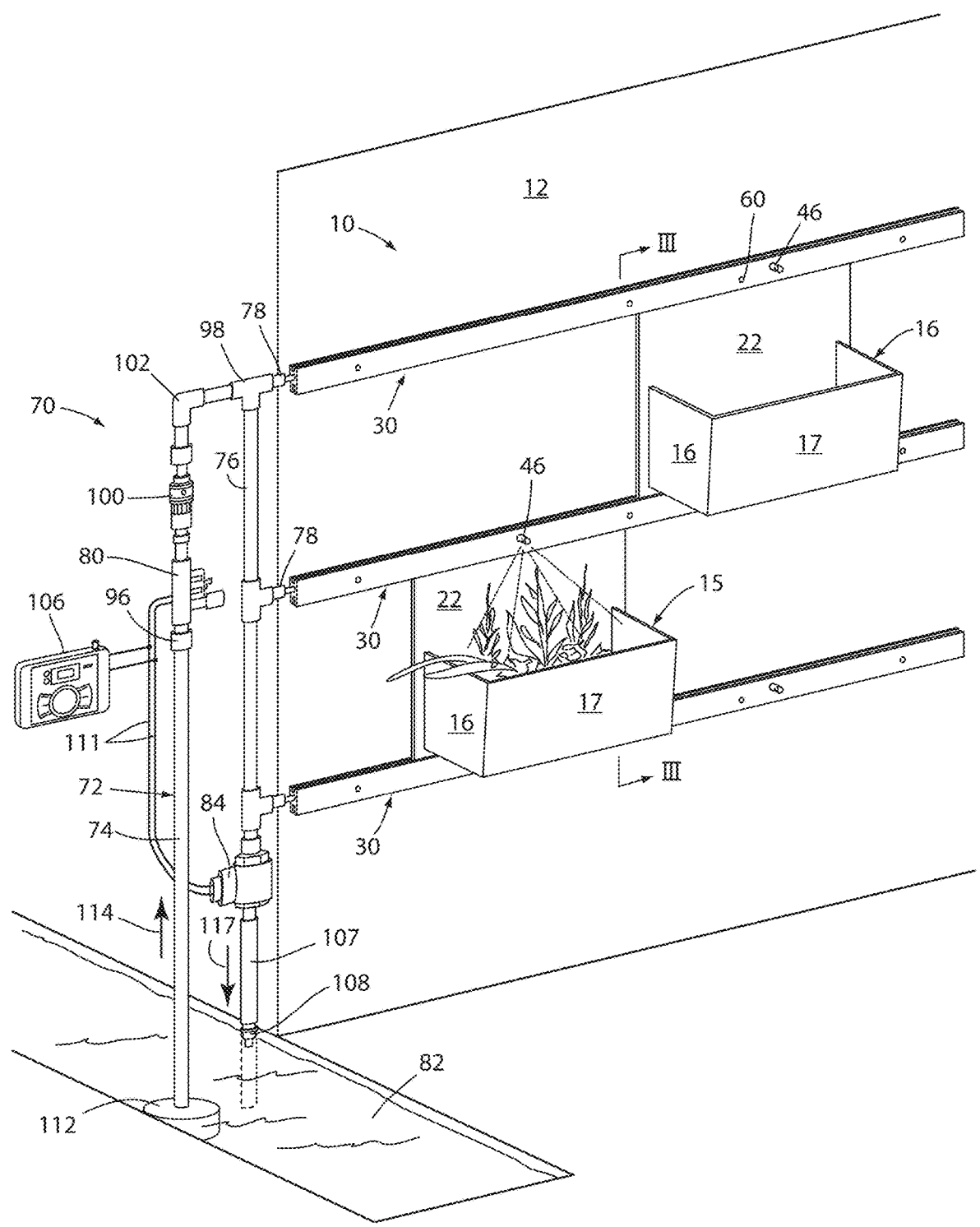
FIG. 1 is a perspective view of a vertical surface employing the modular wall mounted agricultural assembly including a water supply arrangement.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates an embodiment of a modular wall mounted agricultural assembly. In the illustrated example, the modular wall mounted agricultural assembly 10 is employed on, and secured to, a vertical wall surface 12 of a building structure, although the wall mounted agricultural assembly 10 may be utilized in conjunction with both interior and exterior vertical and substantially vertical wall surfaces. In the illustrated example, the wall mounted agricultural assembly 10 comprises at least one upper planter box 14 and at least one lower planter box 15 positioned at a lower vertical height than the at least one upper planter box 14, but more likely a plurality of upper and lower planter boxes 14, 15, which cooperate to completely cover the vertical wall surface 12.

Figure 2:
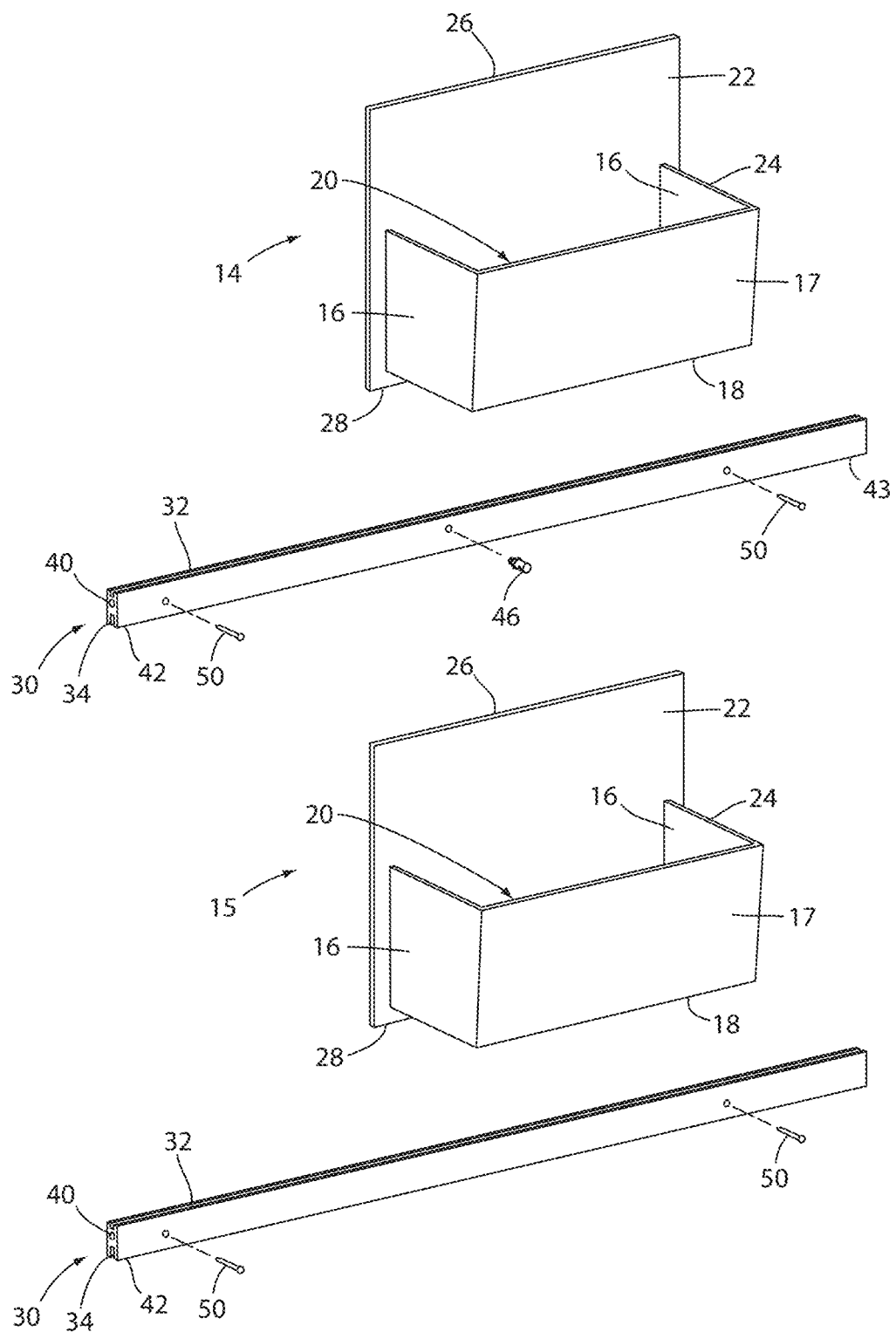
FIG. 2 is an exploded perspective view of the modular wall mounted agricultural assembly.
Figure 3:
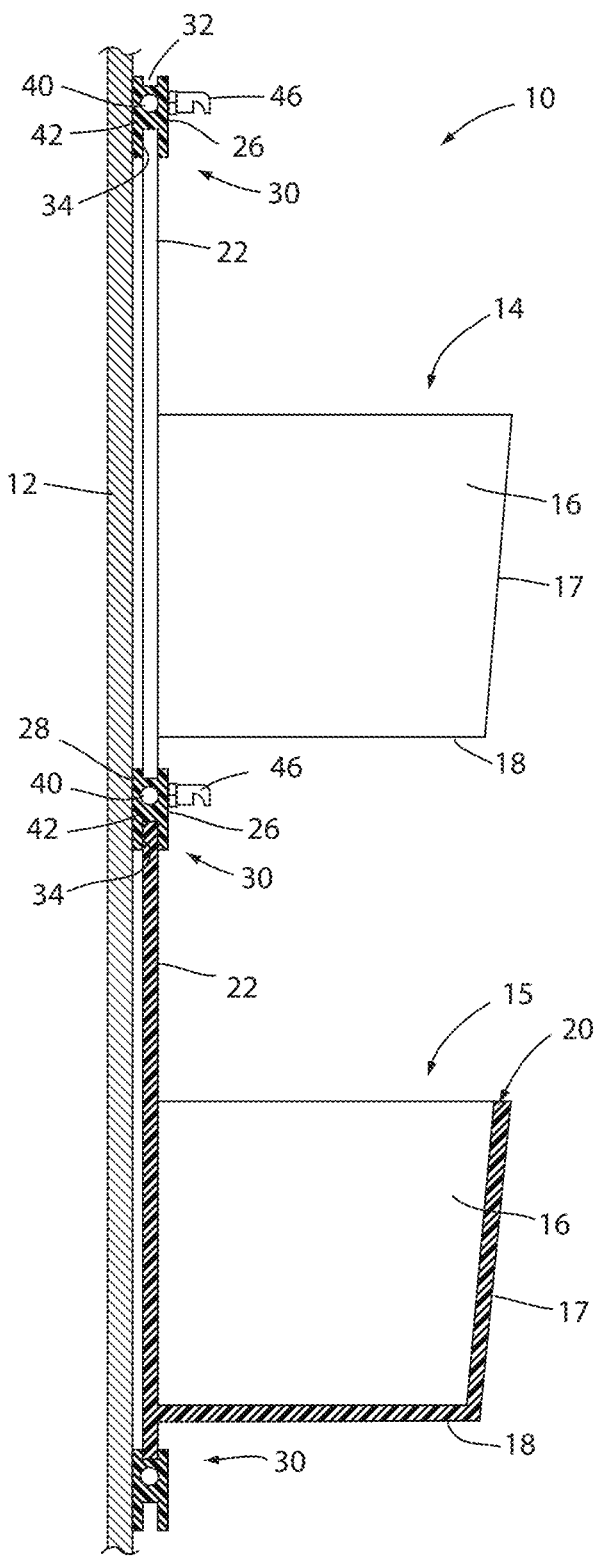
FIG. 3 is a cross-sectional side view of the modular wall mounted agricultural assembly taken along the line III-III, FIG. 1.

As best illustrated in FIGS. 2 and 3, each upper and lower planter box 14, 15 includes a pair of sidewalls 16, a front wall 17, and a bottom wall 18 that cooperate to form an interior compartment 20. The interior compartment 20 is configured to receive plant matter therein, such as plantings and aggregate, e.g., dirt, soil, sand, and the like. The bottom wall 18 may include a plurality of apertures to provide drainage as needed.

Each planter box 14, 15 includes a rearwall 22 that facilitates enclosing the interior compartment 20 and extends upwardly to a point above a top edge 24 of each sidewall 16 and also extends in a substantially downward direction to a point below the bottom wall 18. The wall mounted agricultural assembly 10 includes a plurality of mounting structures 30 that are adapted to receive the planter boxes 14, 15 of the wall mounted agricultural system 10. Each mounting structure 30 is formed to have a substantially H-shaped cross-section along the entire length of the mounting structure 30. The H-shape of each mounting structure 30 forms an upper channel 32 and a lower channel 34 that each extend along the longitudinal direction of the mounting structure 30. The upper channel 32 is sized to receive a lower edge 28 of the rearwall 22 of the planter box 14, 15. The lower channel 34 is sized to receive a top edge 26 of the rearwall 22 of the planter box 14, 15. Therefore, two mounting structures 30 are typically employed to secure each planter box 14, 15.

Figure 4:
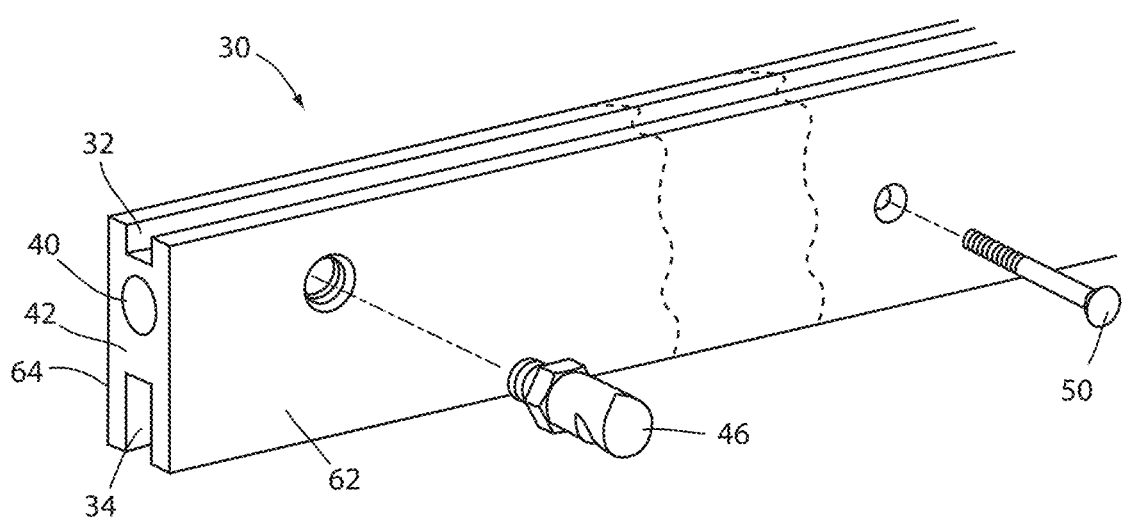
FIG. 4 is an exploded front perspective view of a mounting member and nozzles.
Figure 5:
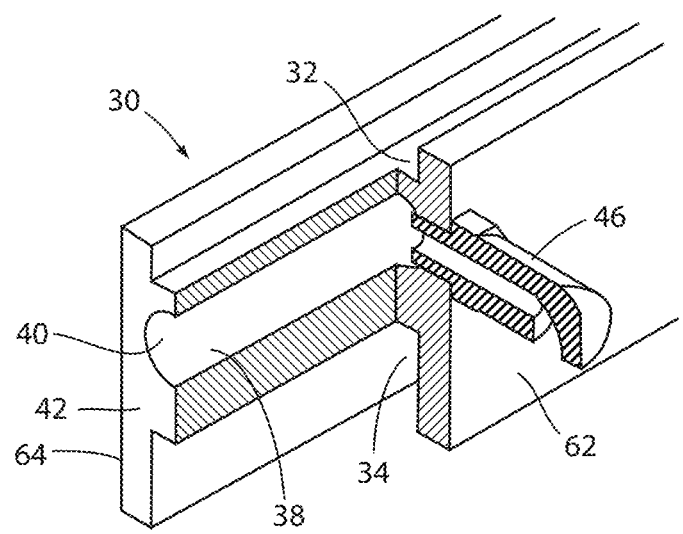
FIG. 5 is a cut-away front perspective view of the mounting member and a nozzle.

As best seen in FIGS. 2, 4 and 5, each mounting structure 30 includes a first end 42, a second end 43, and a conduit or auxiliary fluid supply line 38 that extends along the longitudinal direction of the mounting structure 30. In the illustrated example, an input aperture 40 is located at the first end 42 of the mounting structure 30. Additionally, an output aperture may be included at the second end 43. Alternatively, the auxiliary fluid supply line 38 may be formed separately from the mounting structure 30, or the planter boxes 14, 15 may be attached directly to the wall structure 12 without the use of the mounting structure 30 and the auxiliary fluid supply line 38 may be provided without the use of the mounting structure 30. Tapped into the conduit or auxiliary fluid supply line 38 is a spraying device, such as a nozzle 46. The nozzle 46 is adapted to spray or mist water from the auxiliary fluid supply line 38 onto the plant matter residing in the planter box 14, 15 immediately below the nozzle 46. In assembly, the plurality of mounting structures 30 are secured to the wall surface 12 via a plurality of mechanical fasteners, such as screws 50. The mounting structures 30 are secured to the wall surface 12 in a vertically aligned manner and sufficiently spaced to accommodate planter boxes 14, 15 therebetween. As described previously, the top edge 26 of each planter box 14, 15 securely engages into the bottom channel 34 of a mounting structure 30 and the bottom edge 28 of the planter box 14, 15 rearwall 22 securely engages the top channel 32 of a mounting structure 30.

To further secure the planter box 14, 15 within each mounting structure 30, a screw or other suitable mechanical fastener 60 may be inserted through a front side 62 of the mounting structure 30 and further through the rearwall 22 of an attached planter box 14, 15.

The wall mounted agricultural assembly 10 may also include a fluid supply arrangement 70 for supplying fluids such as water and fertilizers to the plant matter housed within the planter boxes 14, 15. As illustrated, the fluid supply arrangement 70 includes a fluid supply line 72 that includes a primary line 74 and a secondary line 76 as described further below. The second line 76 is fluidly coupled to each auxiliary fluid supply line 38 via a press fitting or threaded fitting 78. The fluid supply arrangement 70 further includes a first valve or water feed valve 80 positioned downstream of a fluid or water source 82 and upstream of the auxiliary fluid supply line 76, and a second valve or drain flush valve 84 positioned downstream of the auxiliary fluid supply line 38. The water feed valve 80 is coupled to the primary line 74 via a slip fit 96 and to an input end 98 of the second line 76 via a quick connect 100 for ease of assembly and an elbow 102 for a reduced packaging configuration. Alternatively, the quick connect 100 may be replaced with or used in conjunction with a pressure regulator (not shown). The water feed valve 80 is operable between an open position which allows fluid to flow from the fluid source 82, through the primary line 74 and the secondary line 76, and into the auxiliary fluid supply lines 38, and a closed position that prevents such flow, while the drain flush valve is operable between a closed position that forces fluid supplied to the secondary line 76 to flow into the auxiliary fluid supply lines 38, and an open position that allows fluid to discharge from the secondary line 76 via a drain tube 107 having a secondary outlet 108, as further described below.

The agricultural assembly 10 may also include a controller 106 operably coupled to both the water feed valve 80 and the drain flush valve 84 via electrical communication lines 111. The controller 106 may include a timer 110 to operate the agricultural assembly 10 at predetermined time intervals in the manner described below.

In operation, the controller 106 is configured to operate a pump 112 to supply fluid from the fluid source 82 to the primary line 74 in a direction 114. In this configuration, the controller 106 moves the water feed valve 80 to the open position thereby allowing fluid to pass from the primary line 74 to the secondary line 76, and the drain flush valve 84 to the closed position thereby forcing fluid flowing from the secondary line 76 to flow into the auxiliary supply lines 38, through the nozzles 46 and into the planter boxes 14, 15. Once a predetermined watering time has elapsed, the controller 82 deactivates the pump 112, moves the water feed valve 80 to the closed position thereby preventing fluid from flowing from the primary line 74 to the secondary line 76, and moves the drain flush valve 84 to the open position thereby allowing fluid to flow from the secondary line 76 into the drain tube 107 in a direction 117 without necessarily entering the auxiliary fluid supply lines 38. In this configuration, fluid present in the fluid supply line 72 at the time the agricultural assembly is deactivated, i.e., when a watering cycle is terminated, drains from the secondary line 76 via the drain tube 108 without entering the auxiliary fluid supply lines 38 thereby preventing "overwatering" of the plant matter within the planter boxes 14, 15, and particularly plant matter within the lower planter boxes 15. It is noted that the outlet 108 of the drain tube 107 may be in fluid communication with the fluid source 82 thereby returning the fluid draining from the drain tube 107 to the fluid source 82, or may be alternatively routed. T-shaped connecters 104 connect the secondary line 76 to each of the fittings 78.

The present inventive modular wall mounted agricultural assembly allows plant matter to be secured to vertical and substantially vertical surfaces of wall structures of free standing walls and buildings, thereby increasing the aesthetic appearance of the structure as well as improving the thermal efficiency of associated buildings. Further, the agricultural assembly allows substantial and complete watering of plants located within planter boxes positioned at varying vertical positions while preventing the "overwatering" of the plant matter within the planter boxes, and in particular the planter boxes positioned at the relatively lower heights. Moreover, the wall mounted agricultural assembly provides a durable outer surface to the structure to which it is attached, and includes a relatively uncomplicated design that may be installed and maintained by relatively unskilled personal. The present inventive planting system is efficient to use, capable of a long operating life, and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A wall mounted agricultural assembly, comprising:
   a first planter configured to attach to a substantially vertical wall structure at a first vertical height and having a first interior space configured to receive plant matter;
   a second planter configured to attach to the wall structure at a second vertical height that is less than the first vertical height and having a second interior space configured to receive plant matter; and
   a water supply arrangement, comprising:
      a fluid supply line configured to deliver a fluid from a fluid supply to the first interior space of the first planter and the second interior space of the second planter;
      a first valve in fluid communication with the fluid supply line downstream of the fluid supply and upstream of the first planter, the first valve operable between an open position where the fluid may be provided from the fluid supply to the first interior space of the first planter and the second interior space of the second planter, and a closed position preventing the fluid from being supplied from the fluid supply to the first interior space of the first planter and the second interior space of the second planter; and
      a second valve in fluid communication with the fluid supply line downstream of the second planter, the second valve operable between a closed position requiring the fluid to enter the first interior space of the first planter and the second interior space of the second planter, and an open position allowing the fluid to bypass the first interior space of the first planter and the second interior space of the second planter, wherein the second valve is in the closed position when the first valve is in the open position, and the second valve is in the open position when the first valve is in the closed position.

2. The wall mounted agricultural assembly of claim 1, wherein the water supply arrangement further comprises a drain tube in fluid communication with the second valve and positioned downstream of the second valve, wherein the fluid drains into the drain tube when the second valve is in the open position.

3. The wall mounted agricultural assembly of claim 2, wherein the drain tube is in fluid communication with the fluid supply, and wherein the fluid supply is downstream of the drain tube.

4. The wall mounted agricultural assembly of claim 3, wherein the drain tube is located vertically below the second valve.

5. The wall mounted agricultural assembly of claim 4, further comprising:
   a third planter configured to attach to the wall structure at a third vertical height that is less than the second vertical height and having a third interior space configured to receive plant matter, wherein the fluid supply line is in fluid communication with the third interior space.

6. The wall mounted agricultural assembly of claim 5, wherein the water supply arrangement further comprises a controller configured to control the first and second valves between the open and closed positions, respectively.

7. The wall mounted agricultural assembly of claim 6, wherein the controller includes a timer configured to activate the controller to move the first and second valves between the open and closed positions, respectively, at predetermined time sequences.

8. The wall mounted agricultural assembly of claim 7, wherein the water supply arrangement further comprises at least one auxiliary fluid supply line configured to deliver the fluid from the fluid supply line to the first, second and third interior spaces.

9. The wall mounted agricultural assembly of claim 8, wherein the at least one auxiliary fluid supply line includes at least one nozzle configured to spray the fluid into the first, second and third interior spaces.

10. The wall mounted agricultural assembly of claim 1, further comprising:
    a third planter configured to attach to the wall structure at a third vertical height that is less than the second vertical height and having a third interior space configured to receive plant matter, wherein the fluid supply line is in fluid communication with the third interior space.

11. The wall mounted agricultural assembly of claim 1, wherein the water supply arrangement further comprises a controller configured to control the first and second valves between the open and closed positions, respectively.

12. The wall mounted agricultural assembly of claim 1, wherein the water supply arrangement further comprises at least one auxiliary fluid supply line configured to deliver the fluid from the fluid supply line to the first and second interior spaces.

13. The wall mounted agricultural assembly of claim 12, wherein the at least one auxiliary fluid supply line includes at least one nozzle configured to spray the fluid into the first and second interior spaces.

14. A wall mounted agricultural assembly, comprising:
    a first planter configured to attach to a substantially vertical wall structure at a first vertical height and having a first interior space configured to receive plant matter;
    a second planter configured to attach to the wall structure at a second vertical height that is less than the first vertical height and having a second interior space configured to receive plant matter; and
    a water supply arrangement, comprising:
       a fluid supply line configured to deliver a fluid from a fluid supply to the first interior space of the first planter and the second interior space of the second planter;
       a first valve in fluid communication with the fluid supply line downstream of the fluid supply and upstream of the first planter, the first valve operable between an open position where the fluid may be provided from the fluid supply to the first interior space of the first planter and the second interior space of the second planter, and a closed position preventing the fluid from being supplied from the fluid supply to the first interior space of the first planter and the second interior space of the second planter;

a second valve in fluid communication with the fluid supply line downstream of the second planter, the second valve operable between a closed position requiring the fluid to enter the first interior space of the first planter and the second interior space of the second planter, and an open position allowing the fluid to bypass the first interior space of the first planter and the second interior space of the second planter, wherein the second valve is in the closed position when the first valve is in the open position, and the second valve is in the open position when the first valve is in the closed position; and a drain tube in fluid communication with the second valve and positioned downstream of the second valve, wherein the fluid drains into the drain tube when the second valve is in the open position, and wherein the drain tube is located vertically below the second valve; and a controller configured to control the first and second valves between the open and closed positions, respectively.

15. The wall mounted agricultural assembly of claim 14, wherein the drain tube is in fluid communication with the fluid supply, and wherein the fluid supply is downstream of the drain tube.

16. The wall mounted agricultural assembly of claim 14, further comprising:

a third planter configured to attach to the wall structure at a third vertical height that is less than the second vertical height and having a third interior space configured to receive plant matter, wherein the fluid supply line is in fluid communication with the third interior space.

17. The wall mounted agricultural assembly of claim 14, wherein the controller includes a timer configured to activate the controller to move the first and second valves between the open and closed positions, respectively, at predetermined time sequences.

18. The wall mounted agricultural assembly of claim 14, wherein the water supply arrangement further comprises at least one auxiliary fluid supply line configured to deliver the fluid from the fluid supply line to the first and second interior spaces.

19. The wall mounted agricultural assembly of claim 18, wherein the at least one auxiliary fluid supply line includes at least one nozzle configured to spray the fluid into the first and second interior spaces.

* * * * *